United States Patent
Hardee et al.

(10) Patent No.: US 10,732,794 B2
(45) Date of Patent: Aug. 4, 2020

(54) METHODS AND SYSTEMS FOR MANAGING IMAGES

(71) Applicant: INTERNATIONAL BUSINESS MACHINES CORPORATION, Armonk, NY (US)

(72) Inventors: Christopher J. Hardee, Raleigh, NC (US); Steven R. Joroff, River Vale, NJ (US); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 15/483,047

(22) Filed: Apr. 10, 2017

(65) Prior Publication Data

US 2018/0293455 A1    Oct. 11, 2018

(51) Int. Cl.
*G06F 3/0482* (2013.01)
*G06F 3/0488* (2013.01)
*G06F 16/50* (2019.01)

(52) U.S. Cl.
CPC .......... *G06F 3/0482* (2013.01); *G06F 3/0488* (2013.01); *G06F 16/50* (2019.01)

(58) Field of Classification Search
None
See application file for complete search history.

(56) References Cited

U.S. PATENT DOCUMENTS

| | | | |
|---|---|---|---|
| 8,553,981 B2 | 10/2013 | Mei et al. | |
| 2011/0238690 A1* | 9/2011 | Arrasvuori | G06F 3/04812 707/769 |
| 2014/0019484 A1 | 1/2014 | Coppin et al. | |

FOREIGN PATENT DOCUMENTS

WO    2015073383 A1    5/2015

OTHER PUBLICATIONS

Daniel Vogel, "Shift: A Technique for Operating Pen-Based Interfaces Using Touch" CHI 2007 (Year: 2007).*

* cited by examiner

*Primary Examiner* — Mark Roz
(74) *Attorney, Agent, or Firm* — Griffiths & Seaton PLLC

(57) ABSTRACT

Embodiments for managing images by one or more processors are described. A selection of at least one portion of a first image is received. A selection of a characteristic of the at least one selected portion of the first image is received. At least one of a plurality of second images is selected based on the selected characteristic of the at least one selected portion of the first image.

15 Claims, 14 Drawing Sheets

METHODS AND SYSTEMS FOR MANAGING IMAGES

BACKGROUND OF THE INVENTION

Field of the Invention

The present invention relates in general to computing systems, and more particularly, to various embodiments for managing images.

Description of the Related Art

In recent years, computing devices, such as mobile electronic devices (e.g., cellular/mobile/smart phones, personal digital assistants (PDAs), and tablets), have become widely used to the point that many people now have such a device with them at all times. These devices are able to assist users is a multitude of ways in their daily lives, such as with respect to communication, internet access, scheduling, and entertainment.

Many, if not most, such devices now include an integrated camera that allows the user to instantly take photographs (and/or record videos) to such an extent that users often have thousands of photographs stored on their devices. With such a great number of photographs stored, it is difficult for the user to navigate, search through, organize, and/or otherwise manage the photographs in such a way that particular photographs (e.g., showing particular objects or people) can be quickly and easily found. Rather, the user must typically sort through the images one-by-one.

SUMMARY OF THE INVENTION

Various embodiments for managing images by one or more processors are described. In one embodiment, by way of example only, a method for managing images, again by one or more processors, is provided. A selection of at least one portion of a first image is received. A selection of a characteristic of the at least one selected portion of the first image is received. At least one of a plurality of second images is selected based on the selected characteristic of the at least one selected portion of the first image.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
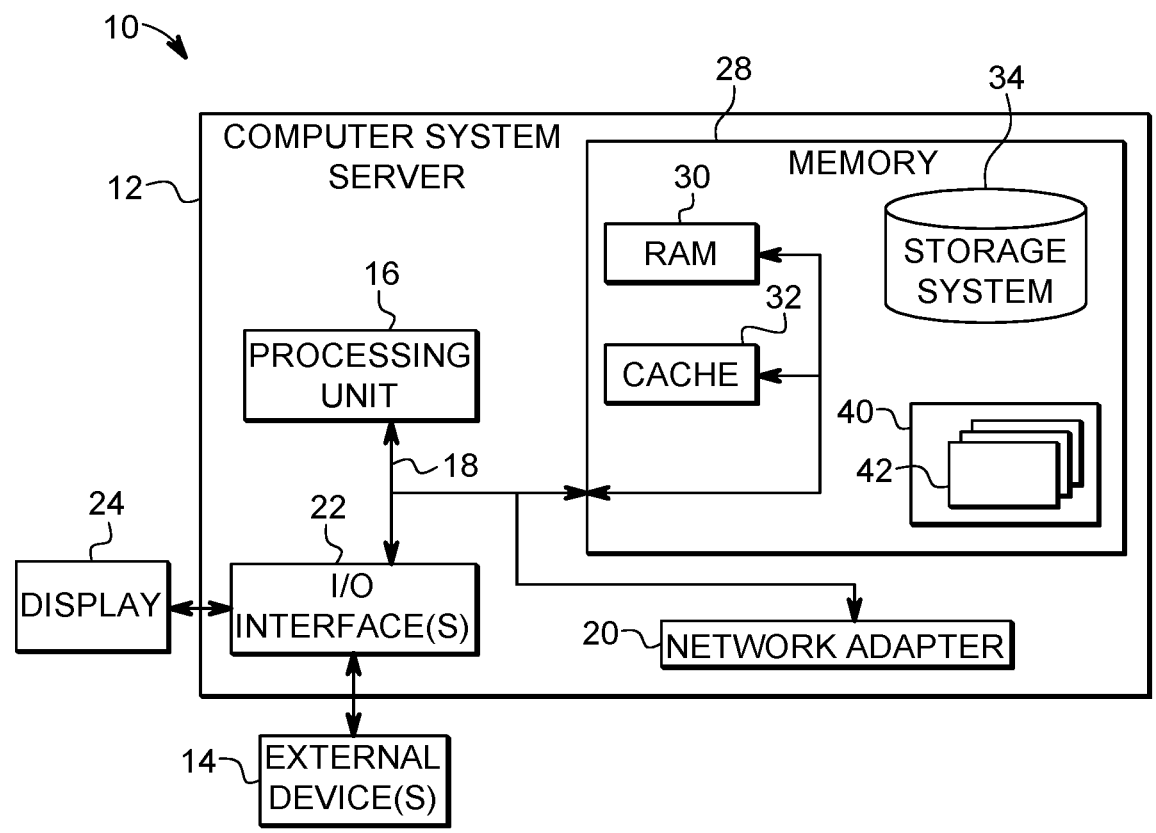
FIG. 1 is a block diagram depicting an exemplary computing node according to an embodiment of the present invention.

As previously indicated, modern computing devices, such as mobile electronic devices (or mobile devices) often include an integrated camera that allows users to quickly and easily take photographs or images (and/or record videos). Often, the devices have so many photographs stored thereon that it becomes difficult to find particular photographs when so desired. Rather, the user must typically sort through the images one-by-one until the desired photograph(s) has been located. This may be the case even if the photographs are sorted or filtered by, for example, the date when they were taken.

Consider an example in which a particular user frequently takes photographs of automobiles with his/her device (e.g., the person is a car enthusiast), which are stored on the device and/or in a remote computing system (e.g., online). In the event that the user wants to find images that show an automobile that is similar to that shown in a particular one of the photographs (or images), the user would generally have to manually search through the stored images, one-by-one, until he/she finds the ones that suitably match. At which point, the user may somehow "mark" the particular images by, for example, making them a "favorite," (re)organizing them, etc.

In view of the foregoing, a need exists for methods and systems that allow users to easily find images that share characteristics (or "dimensions" or attributes) with a particular image and/or identify images with such shared characteristics.

To address these needs, the methods and systems of the present invention, for example, allow the user to select one or more portions (or regions) of (at least one) image rendered on a computing device and specify one ore more characteristics about the portion(s) of the image. The accessible/searchable images (e.g., stored on the same computing device or elsewhere) are then searched and selected based on the selected portion(s) and characteristic(s). The selected images (or image set), or a list thereof, is then displayed.

For example, the user may begin by viewing an initial (or first or seed) image that is rendered (or displayed) on a computing device (e.g., a mobile phone). In some examples, the user selects a portion of the image, or a "dynamic dimensional hotspot," (which may be the entire image) through a user interface (e.g., a gesture on/proximate to the display screen in touchscreen embodiments or via moving a cursor via a touch pad or keys). After the portion of the image is selected, the available (or second) images are searched to identify images that are related to the initial image by, for example, having a characteristic in common with the selected portion(s) of the initial image.

The characteristic used may be based on a user setting/preference that is indicated or selected (perhaps via a default setting) before the user selects the portion(s) of the initial image. For example, the characteristic may be related to the type of image, or image portion, selected (e.g., clip art, photograph, color photograph, black/white photograph, etc.). However, any suitable characteristic may be used, such as color, size, object type, time, location, etc.

Alternatively, the user may be prompted to select the characteristic (e.g., via a pop-up window or menu) after the selection of the portion(s) of the image has been received. For example, the user may select to search for images that include object types similar to that shown in the selected portion(s) of the images. In such cases, after the selection of the characteristic has been made, the selected characteristic is then used to search through the available images. The appropriate images are then identified and indicated to the user (e.g., the selected image set is displayed on the computing device).

In some embodiments, additional search parameters may be indicated by the user (and/or otherwise used). For example, in touchscreen applications, the number of search results may be selected by the user depending on how long they contact the touch screen when selecting the portion(s) of the image and/or when selecting the characteristic (e.g., as the screen is contacted for a longer period of time, a greater number of search results are provided).

After the characteristic and other search parameters have been selected, and the appropriate images have been selected, the selected images may be displayed to the user. In some examples, the selected images are displayed in their entirety. However, in other embodiments, only portions of the selected images (e.g., corresponding to an object type that was the subject/characteristic selected to be searched) are displayed, such as by "zooming in" on the appropriate portion(s) of the images or "cropping" the images.

In some embodiments, a method for managing (and/or navigating) images by one or more processors is provided. A selection of at least one portion of a first image is received. A selection of a characteristic of the at least one selected portion of the first image is received. At least one of a plurality of second images is selected based on the selected characteristic of the at least one selected portion of the first image.

The selected characteristic of the at least one selected portion of the first image may include at least one of a color or an object type. The first image may be rendered on a first computing device, and at least some of the plurality of second images are stored in a memory of a second computing device, wherein the second computing device is remote from the first computing device.

The selected at least one of the plurality of second images may be rendered on a display of a computing device. The rendering of the selected at least one of the plurality of second images on the display of the computing device may include generating a visual indication of the selected characteristic of the selected at least one portion of the first image on the selected at least one of the plurality of second images.

The first image may be rendered on the display of a computing device, and at least one of the receiving of the selection of the at least one portion of the first image and the receiving of the selection of the characteristic of the at least one selected portion of the first image may include detecting a user input device within a proximity of the display.

A characteristic menu may be rendered on the display after the receiving of the selection of the at least one portion of the first image. The receiving of the selection of the characteristic of the at least one selected portion of the first image may include receiving a selection of an item within the characteristic menu.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or enabling or causing) any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, various computing devices, such as laptops and mobile devices, such as mobile (or cellular and/or smart) phones, PDAs, tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
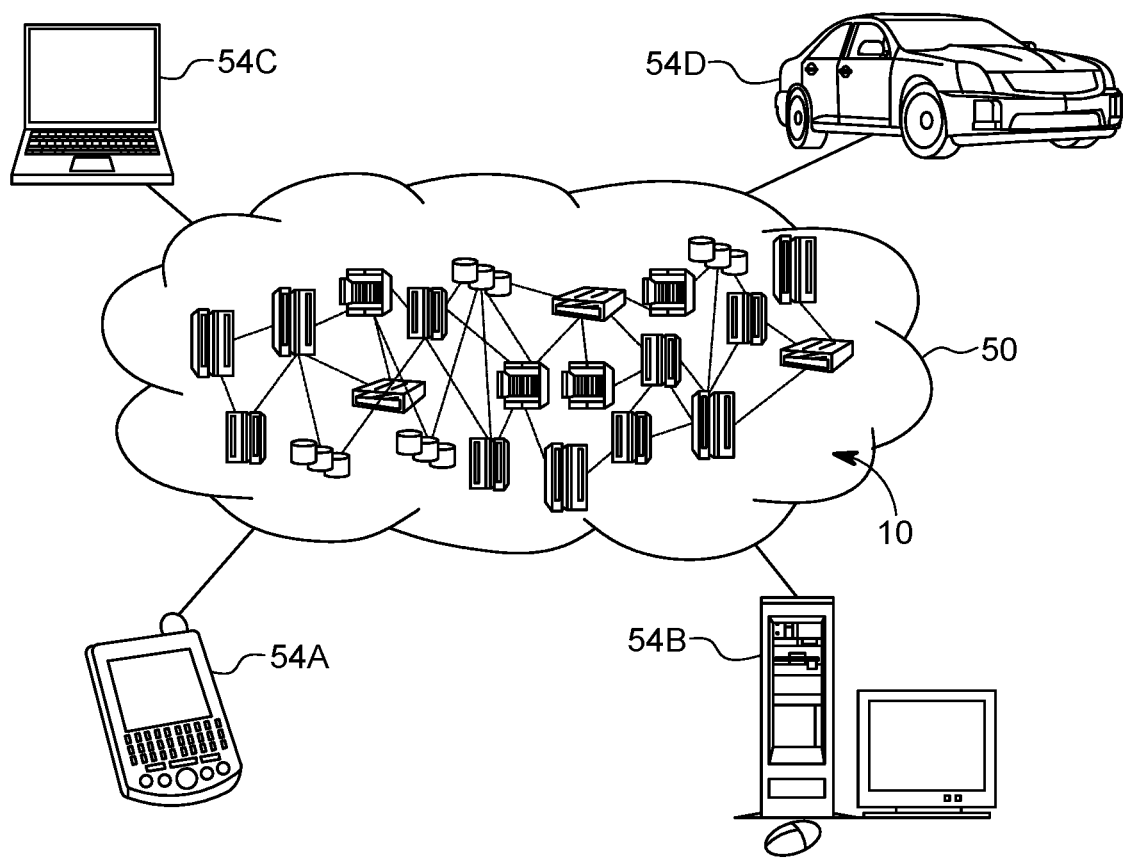
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54D, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
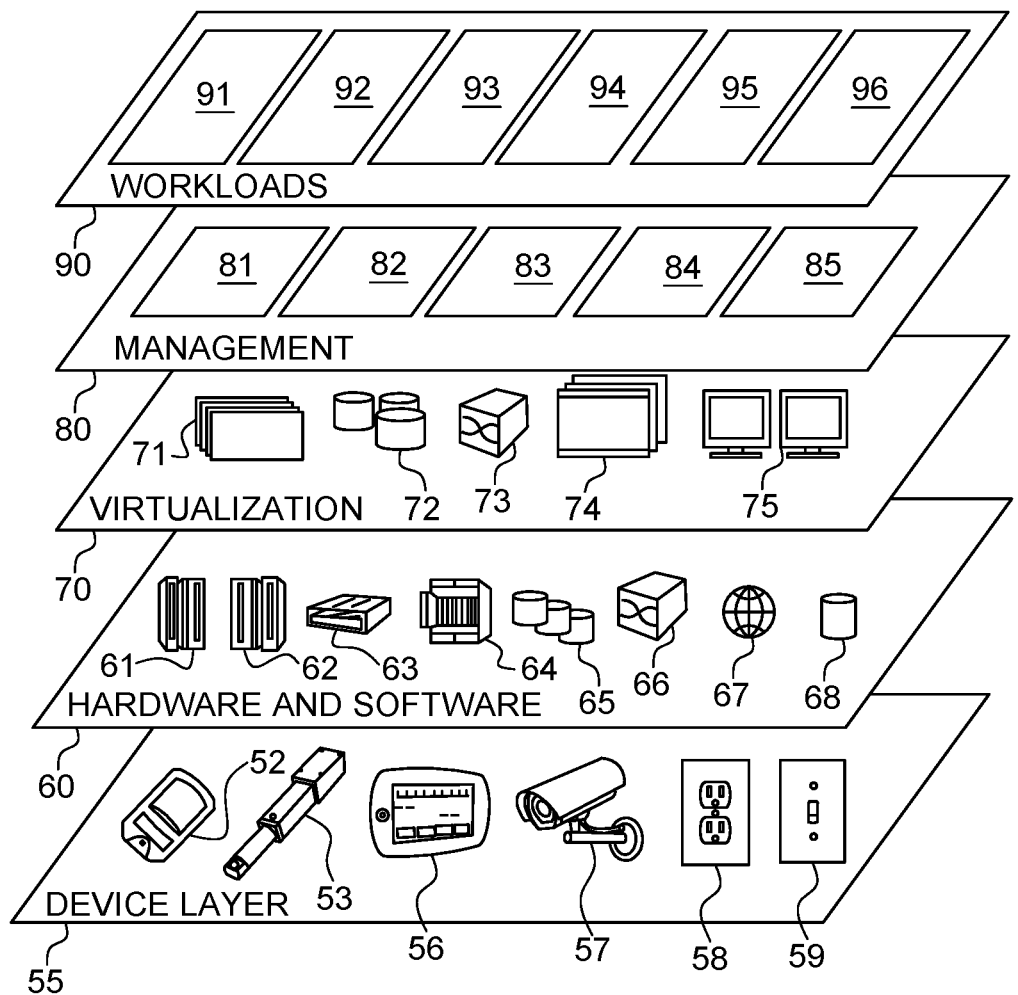
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, computing devices such as desktops, mobile devices, and computing systems within vehicles (e.g., automobiles, aircraft, watercraft, etc.), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing images as described herein. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing, or navigating, images by one or more processors. A selection of at least one portion of a first image is received. A selection of a characteristic of the at least one selected portion of the first image is received. At least one of a plurality of second images is selected based on the selected characteristic of the at least one selected portion of the first image.

Figure 4:
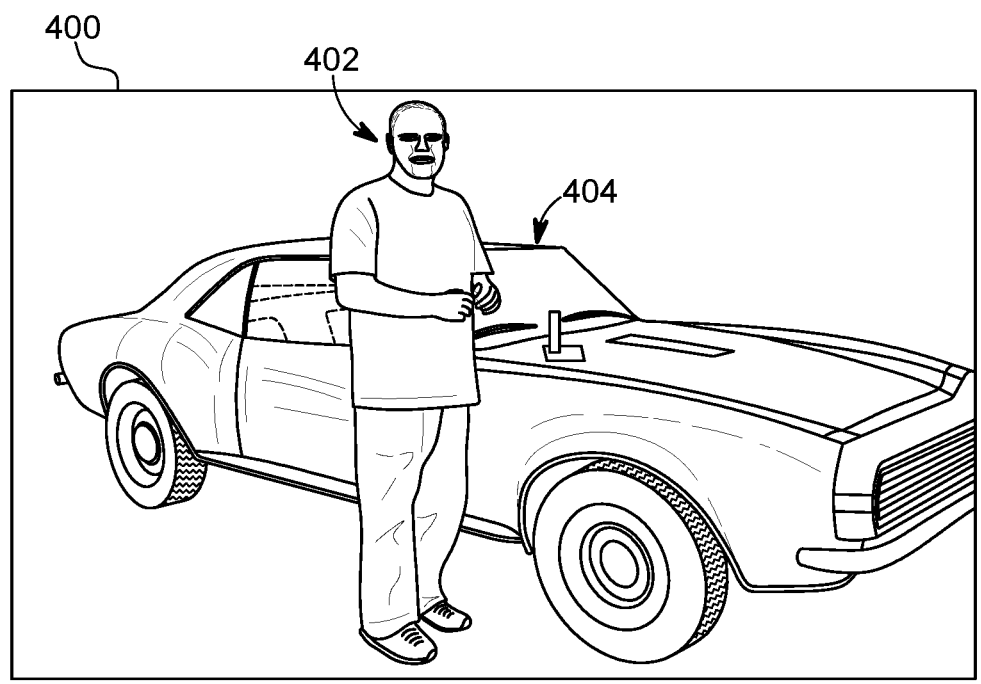
FIGS. 4-8 are plan views of an image, illustrating various aspects of functionality in accordance with various aspects of the present invention.

Referring to FIG. 4, an exemplary image (i.e., a first or initial or seed image) 400 is shown, as it may be rendered by a computing device (e.g., on a display screen of a mobile device). Generally, the image 400 shows a person 402 standing in front of an automobile 404, with various other objects and scenery in the background. Although image 400 is repeatedly referred to by this description and shown in the accompanying figures, it should be understood that this particular image (and/or the objects in the image) is merely intended as an example used to set forth various aspects of functionality of embodiments of the present invention. In other embodiments, other images may be used, which depict any type of objects, scenery, etc.

Figure 5:
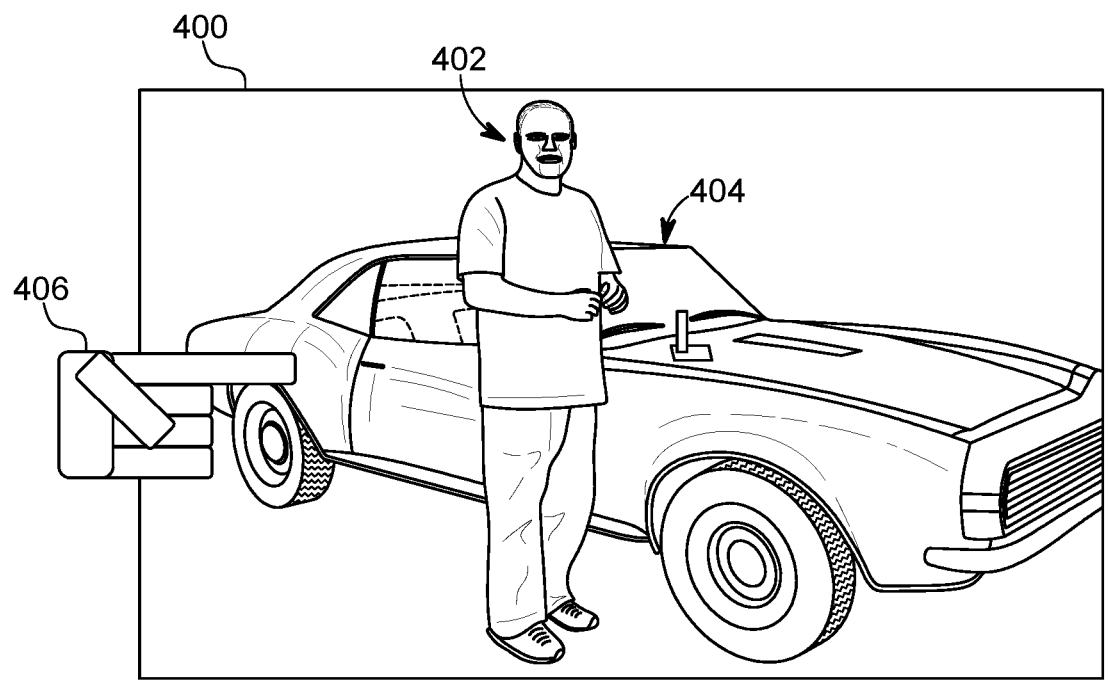

Referring now to FIG. 5, in some embodiments, the user manually selects a portion of the image 400. In the depicted embodiment, the image 400 is rendered on a touchscreen, and as such, a user input device 406 may be used to select the desired portion of the image 400 by moving the user input device into close proximity with the touchscreen (e.g., touching the screen on the desired object, circling the desired object, etc.). In the example shown, the user input device 406 is a hand (and/or finger) of the user, but it should be understood that other user input devices, such as styluses, may be used. Additionally, it should be understood that other methods may be used to select the desired portion of the image 400, such as moving a cursor via keys, touchpad, or other user input device (e.g., in non-touchscreen embodiments). In the depicted embodiment, the user has selected a portion of the image that corresponds to the automobile 404.

In some embodiments, after a portion of the image 400 is selected, the appropriate region(s) of the image 400 are shown in a manner appropriate to indicate the selection thereof. In the example shown in FIG. 6, the automobile 404 has been outlined. In other embodiments, the selected portion(s) of the image 400 may be, for example, highlighted or shaded.

Figure 7:
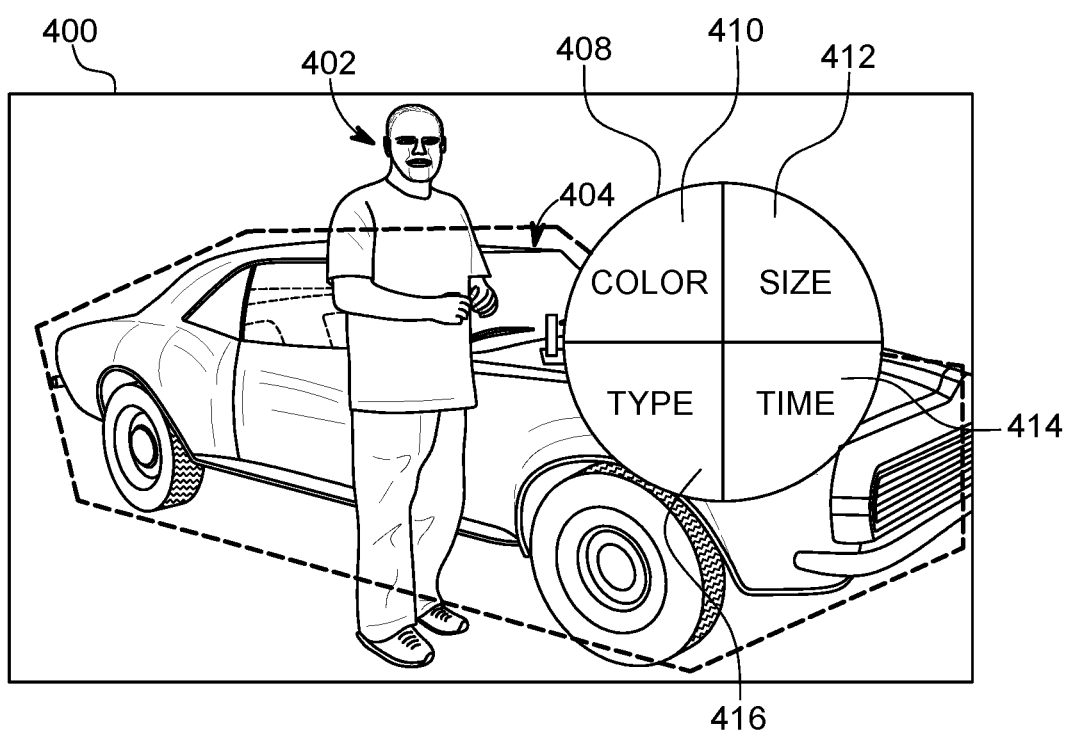

Referring now to FIG. 7, a characteristic menu 408 is then displayed. In some embodiments, the characteristic menu 408 is displayed only after the selection of the desired portion of the image 400 is verified. For example, after the initial selection of the automobile 404, the user may again select (e.g., via an additional touch or "double click") the automobile 404 to indicate that the automobile 404 does in fact correspond to the region of the image 400 that is of interest. In the depicted embodiment, the characteristic menu 408 is a "radial menu" 408 that is rendered (or displayed) over (or on) the automobile 404, which includes several types of characteristics or attributes (or dimensions) that may be associated with the selected portion of the image 400 (i.e., the automobile 404). In the particular example shown, the radial menu includes four sections or segments 410, 412, 414, and 416, which respectively correspond to the characteristics of color (e.g., color of the object/portion of the image), size (e.g., apparent size in the image), time (e.g., time of day and/or when the photograph was taken), and type (e.g., type of object). It should be understood that the characteristic menu 408 shown in FIG. 7 is merely one example of the various ways in which characteristics (or characteristic types) of the selected portion of the image 400 may be presented to and/or selected by the user. In other embodiments, the radial menu 408 may have different shapes and/or different numbers (and/or types) of characteristics, and/or the characteristic menu may be displayed in a pop-up window or in a different screen shot (i.e., so that the image 400 is not visible at the same time). Alternatively, the characteristics may be selected or entered in other ways, such as voice commands.

Figure 8:
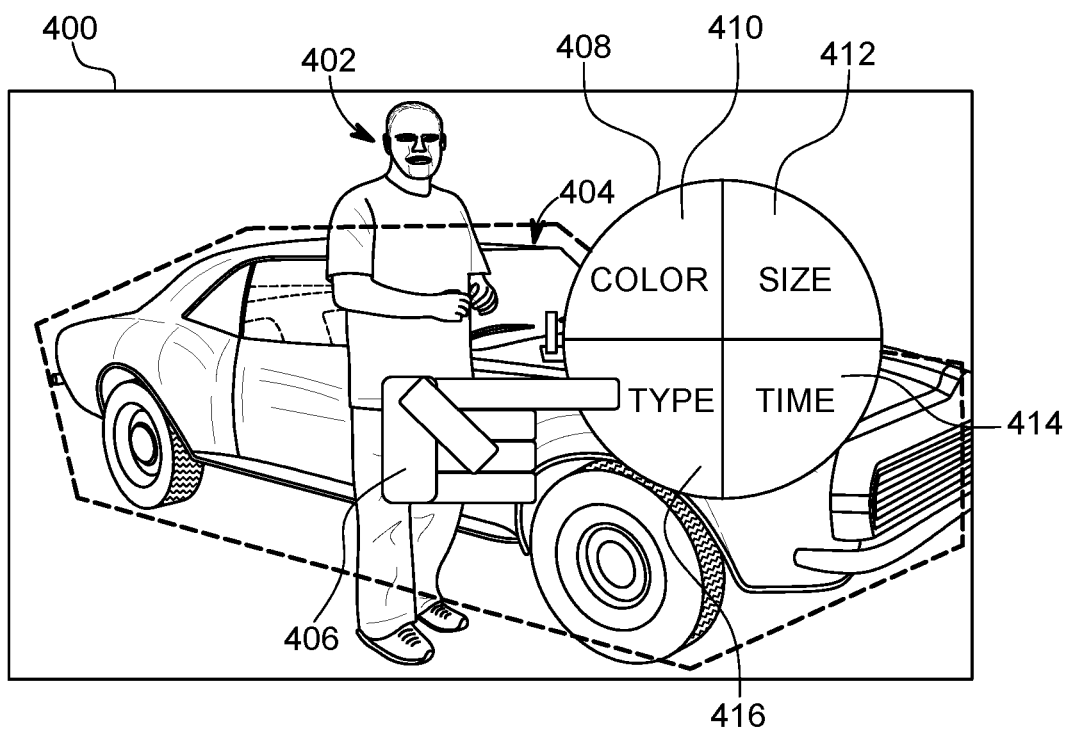

As shown in FIG. 8, one or more of the characteristics is then selected from the characteristic menu 408. In the depicted embodiment, the selection of the characteristic(s) is performed using the user input device (e.g., the finger/hand of the user) 406. In the example shown, characteristic 416 (e.g., "type") is selected. It should be understood that in some embodiments multiple characteristics may be selected (e.g., by performing a gesture/swipe with the finger/hand that contacts more than one of the characteristics 410-416 in the radial menu 408).

After the desired characteristic(s) is selected, the images available to the system (i.e., second or secondary or stored images) are searched (e.g., automatically) based on the selected characteristic(s). The available images may be stored in a memory of the computing device in use (i.e., on which the image 400 is rendered) and/or in one or more computing systems that are remote from the particular computing device (e.g., online, the internet, in a remote server, in the cloud, on another computing device in operable communication via wireless communication, etc.). In the embodiment depicted in FIGS. 4-8, the selection portion of the image 400 corresponded to the automobile 404, and the selected characteristic "type" 416. As such, the system may then search for images that include objects that appear to be similar to the type of automobile (e.g., same/similar make, model, year, etc.). In embodiments in which more than one characteristic is selected, the system may search for images that include objects that correspond to those selected characteristics. For example, referring again to FIG. 8, if both "type" 416 and "color" 410 are selected from the radial menu 408, the system may search for images that include automobiles of the same/similar make, model, etc. and appear to be of the same color.

Additionally, in some embodiments, additional search parameters may be indicated by the user (and/or otherwise used). For example, in touchscreen applications, the number of search results may be selected by the user depending on how long they contact the touch screen when selecting the portion(s) of the image and/or when selecting the characteristic (e.g., as the screen is contacted for a longer period of time, a greater number of search results are provided).

Figure 9:
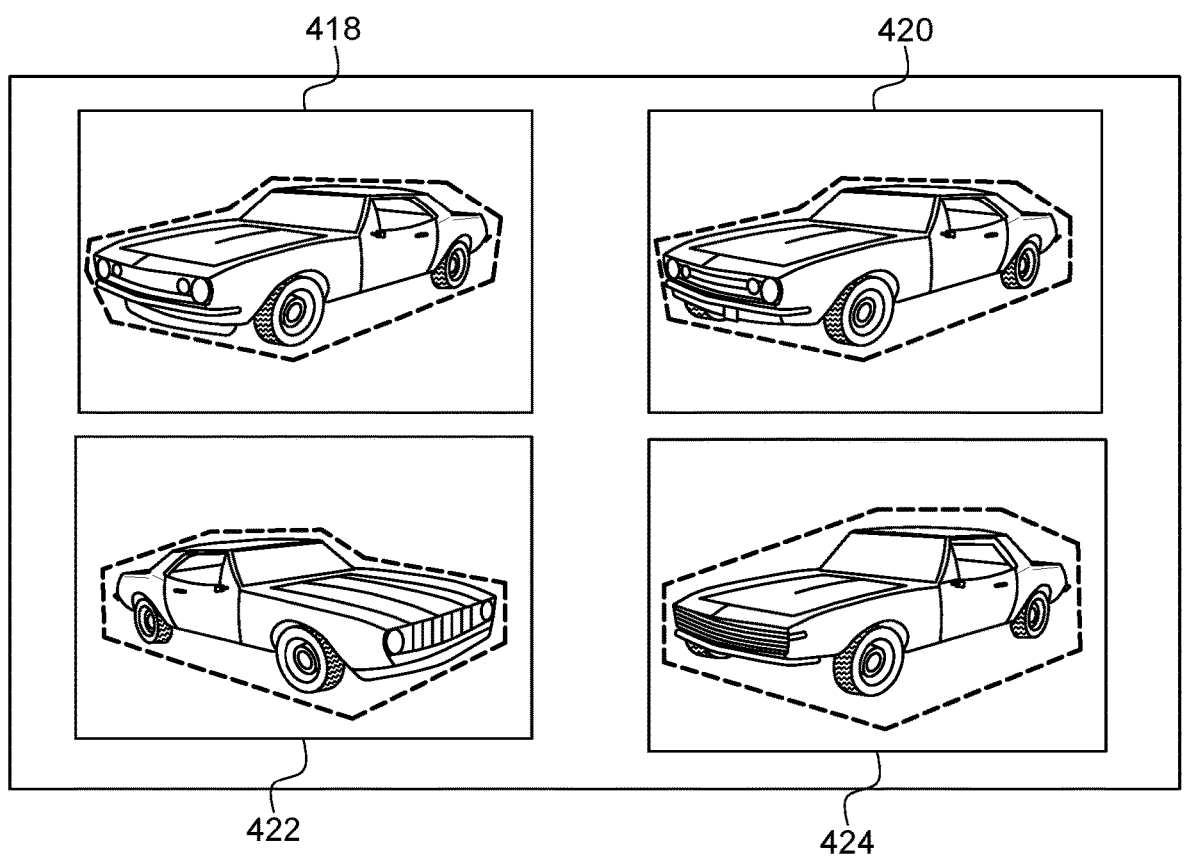
FIG. 9 is a plan of multiple images resulting from an image search according to an embodiment of the present invention.

After the appropriate images have been found, the results of the search may be displayed (e.g., on the same computing device on which the user made his/her selections). FIG. 9 illustrates an exemplary manner in which the results of the search may be displayed. In particular, in FIG. 9, images (searched or stored images) 418, 420, 422, and 424 are shown in a manner in which they may be displayed on the computing device. In the depicted embodiment, images 418-424 are shown in a separated tile or "thumbnail" configuration. However, in other embodiments, the results are displayed in different ways (e.g., overlaid tiles, a list of file/image names, etc).

Of particular interest in FIG. 9 is that each of the images 418-424 includes an object that corresponds to the selected portion of the initial image 400 (i.e., the automobile 404)

and the selected characteristic (or characteristic type), "type" 416, described above. In other words, each of the images 418-424 includes an automobile that appears to be similar to the automobile 404 of the initial image 400. However, it should be noted that the images 418-424 may include images of objects that differ in some respects from the object(s) associated with the selected portion(s) of the initial image 400. For example, if the only characteristic selected is "type" 416, the images identified during the search may include images of objects that are of the same/similar type, but may differ in color. In other words, in the particular embodiment shown in FIGS. 4-8, the images 418-424 selected during the search may include automobiles that are of a color different than automobile 404.

However, as described above, the images identified/selected during the search may be further limited by the characteristics that are selected. For example, referring again to FIG. 8, if both "type" 416 and "color" 410 are selected from the radial menu 408, the system may identify only images that include automobiles of the same/similar make, model, etc. and appear to be of the same (or similar) color.

Figure 6:
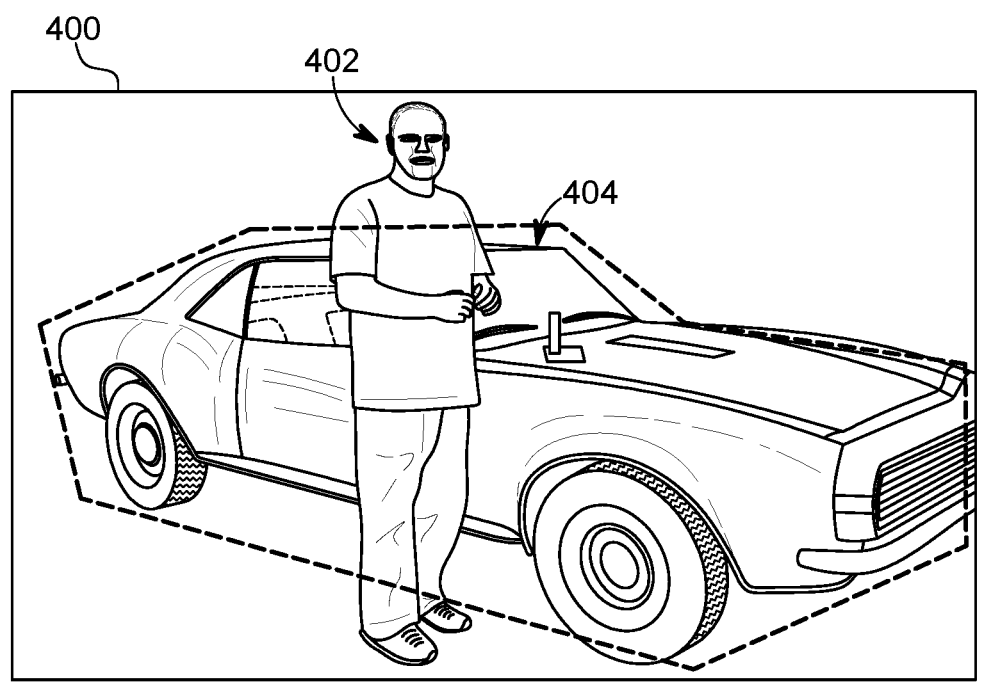

Still referring to FIG. 9, in some embodiments, when the images selected during the search are presented, the object (or image portion) that corresponds to the selected portion of the initial image 400/selected characteristic(s) is shown in a manner different from the remainder of the image (e.g., via outlining, highlighting, shading, etc.) to, for example, indicate to the user why that image was selected during the search. For example, as shown in FIG. 9, in each of the images 418-424, the automobile that is the subject of the image is outlined in a manner similar to how the selected portion of the initial image 400 was outlined when selected (as shown in FIGS. 6 and 7).

Although not specifically shown, it should be understood that the user may select any of the images from the search results and, for example, zoom in and/or display them in a "full screen" mode, save them in a particular location/file on the computing device, mark them as a "favorite," or perform any other suitable action with them. Additionally, in some embodiments, the order in which the selected/identified images are presented or displayed may be related to how closely the particular images match or are related to the selected characteristic. For example, images may be presented in an order such that those images that are deemed to be "better matches" may be given a higher rating or priority than others by being listed earlier in the search results.

Figure 10:
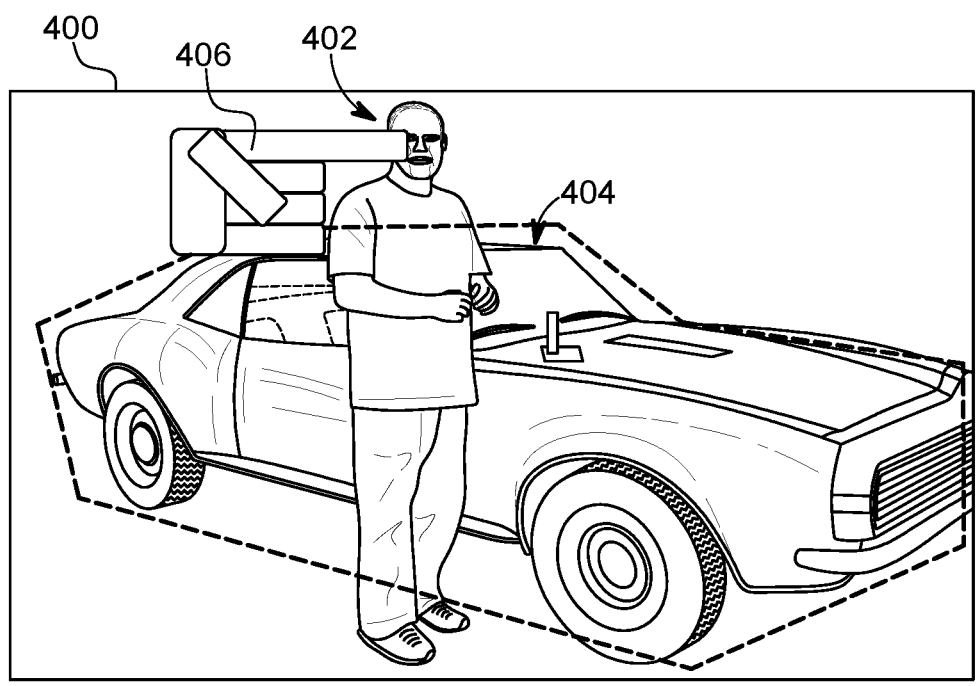
FIGS. 10-13 are plan views of the image of FIGS. 4-8, illustrating additional aspects of functionality in accordance with various aspects of the present invention.
Figure 11:
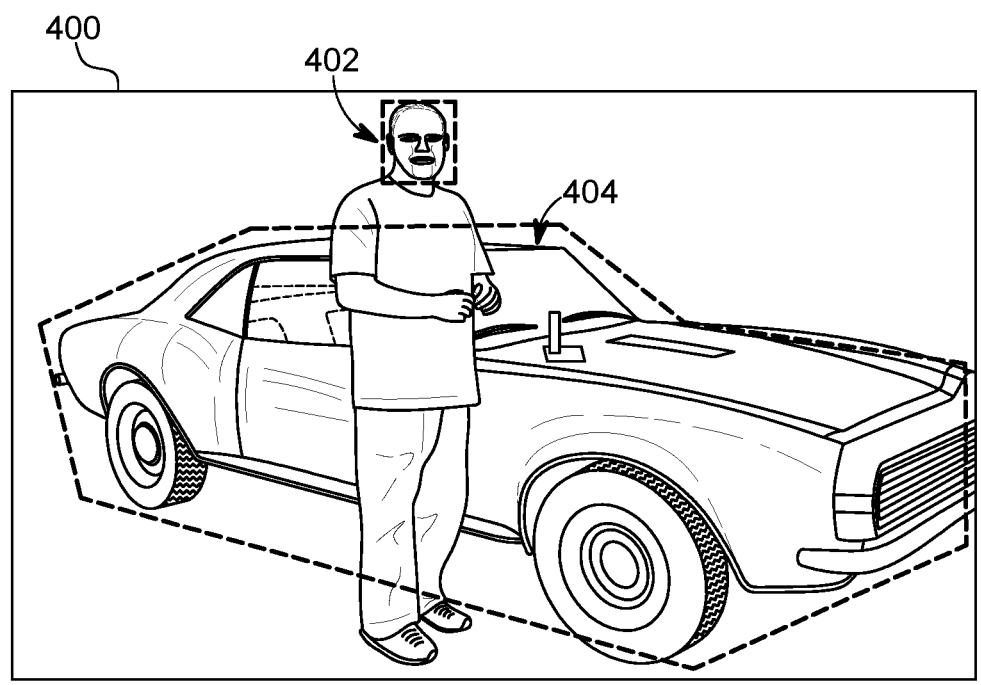

In some embodiments, more than one portion of an image may be selected and used to perform the search for related images. For example, in FIG. 10, the initial image 400 is again shown (e.g., as it would be displayed on the computing device), with the automobile 404 already being selected (e.g., as described above). As shown, the user may manually select a second portion of the initial image 400 with, for example, finger/hand 406 (or use any other suitable method, as described above). In the embodiment shown in FIG. 10, the user selects person 402, or perhaps more particularly, the head/face of the person 402. As shown in FIG. 11, the person 402, or more particularly in the depicted embodiment the head of person 402, is indicated as being selected by being outlined (e.g., in a manner similar to that described above for automobile 404).

Figure 12:
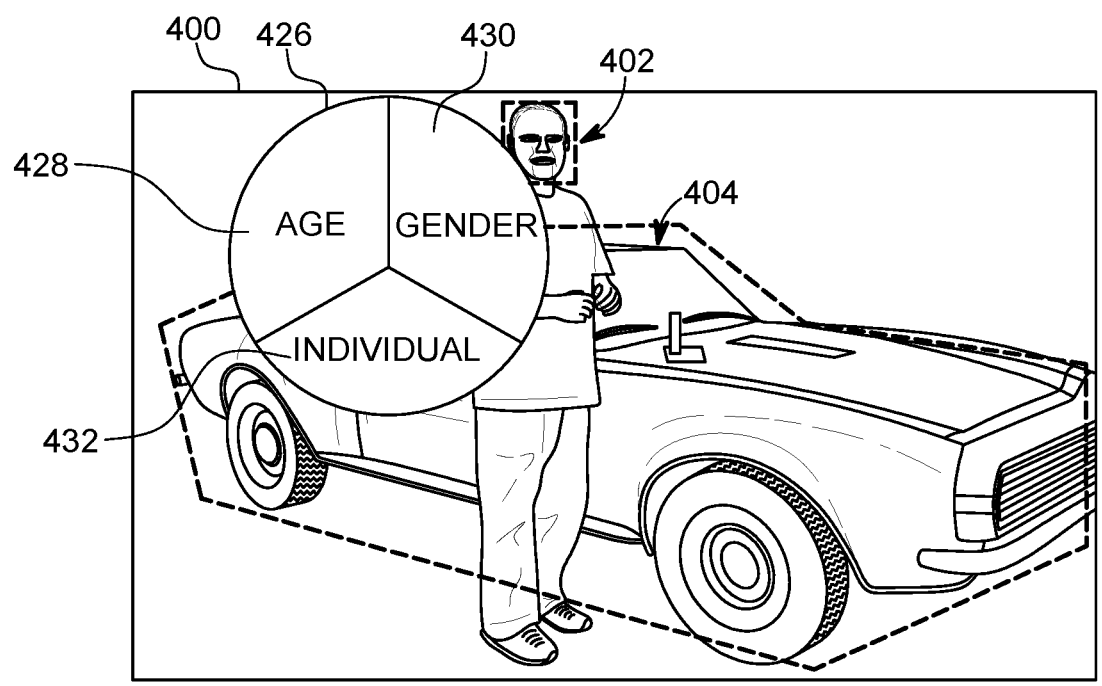

Referring now to FIG. 12, a (second) characteristic menu may then be displayed in a manner similar to characteristic menu 408 (e.g., prompted by a double click on the head of person 402). In the example shown in FIG. 12, the characteristic menu is (again) a radial menu 426 displayed over the particular selected portion of the initial image 400 (e.g., the head of person 402), with three sections or segments 428, 430, and 432, which respectively correspond to the characteristics of age (e.g., the apparent age of the person), gender, and the particular individual (e.g., the size, shape, etc. of the face of the particular person). As such, it should be understood that in some embodiments, the characteristics (or characteristic types) may change depending on the object(s) shown in the selected portion(s) of the initial image 400. In this particular example, because a person is shown, the characteristics listed are related to characteristics of different people (e.g., age, gender, and exact facial structure). Further, it should be noted that some of the characteristics may be more specific or exact than others (e.g., facial structure of a particular individual vs. age).

Figure 13:
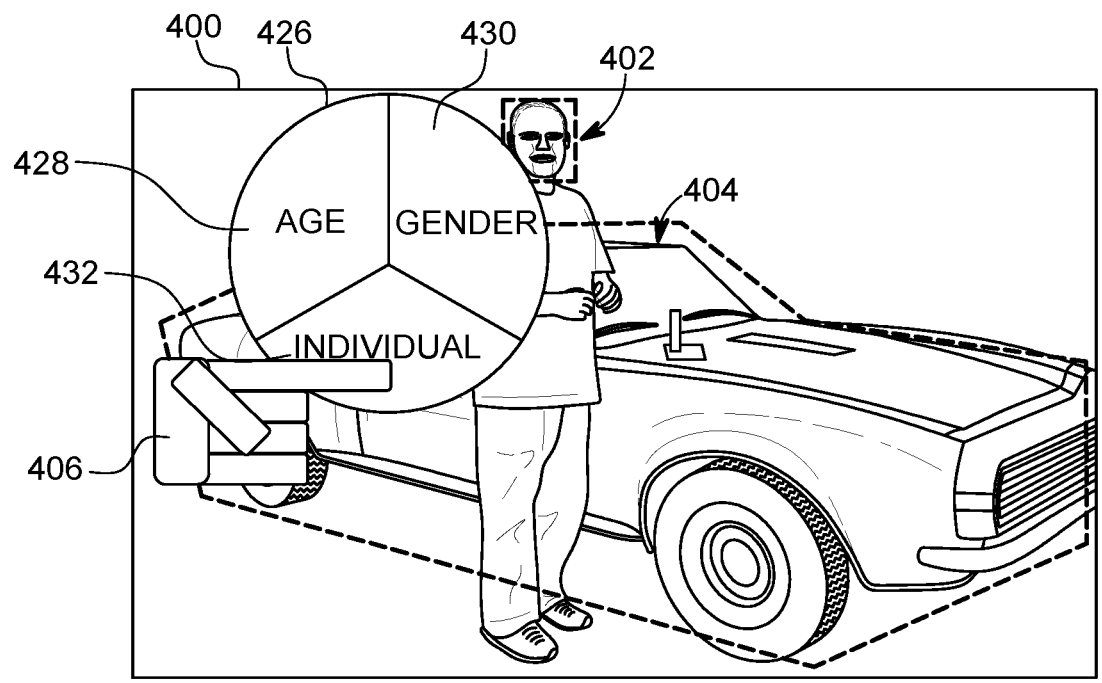

As shown in FIG. 13, the user may then select one or more of the characteristics from the radial menu (or other characteristic menu) 426 in a manner similar to that described above for characteristic menu 408 (FIG. 8). The available images may then be searched and the images selected, based on the selected portion(s) of the initial image 400 and the selected characteristic(s), may be presented in a manner similar to that described above.

In embodiments in which particular characteristics listed in the characteristic menu 426 (and/or 408) are more specific than others, if those characteristics are selected by the user, their selection may in effect override the selection of any other characteristic (e.g., when a gesture performed on the radial menu 426 causes two or more characteristics to be selected). For example, referring to FIG. 13, if both "age" 428 and "individual" 432 are selected, the images selected during the search may be the same as those selected had "individual" 432 been the only characteristic selected (i.e., because "individual" 432 is a more specific characteristic than "age" 428).

Thus, it should be appreciated that multiple portions of the initial image 400 may be selected, along with associated characteristics, to perform the search for related images in a manner more specific than would be the case if only a single portion of the initial image is selected. With respect to the embodiment(s) shown in FIGS. 4-13 and described above, the result may be that the search is performed in a manner that the selected images are those that include both the particular person 402 and an automobile (e.g., similar to automobile 404). In such embodiments, the images selected during the search may then be presented to the user in a manner similar to that described above.

Still referring to FIGS. 4-13, in some embodiments, at least some of the steps described above are performed automatically and/or based on previously assigned selections or settings (e.g., user preferences, system or default settings, etc.). For example, referring again to FIGS. 4 and 5, when the initial image 400 is rendered by the computing device, the automobile 404 (and/or the person 402) may be automatically recognized as being the primary subject(s) of the initial image (e.g., based on the apparent size of the object, the positioning of the object in the image, the focus of the image, a user preference indicating particular object types, etc.). In such embodiments, the automobile 404 (and/or the person 402) may be automatically selected as the portion of the image of interest. Similarly, the characteristic(s) (or characteristic types) upon which the search for related images is performed may be automatically and/or previously assigned in a similar manner, resulting in the search being performed based on those characteristics without input from the user after the desired portion(s) of the initial image 400 has been selected (i.e., either automatically/previously or based on user input). In this manner, the selection of the desired portion(s) of the image and/or the characteristics upon which the search is performed may be performed without any direct user input being applied with respect to any particular initial image 400.

Moreover, it should be understood that at least some aspects of such functionality may be performed as "background" processes that are, for example, automatically performed when any images are made accessible by the system (e.g., when images are stored in a memory on a particular computing device). In this manner, the methods and systems described herein may generate associations/relationships between images similar to those described above (e.g., with respect to shared characteristics) without any explicit user input. For example, the accessible images may be automatically sorted or organized by identifying images with shared characteristics as described above. As such, when a user views a particular image, associations/relationships between that image and other images may have previously been identified such that the user may quickly and easily view the related images without the need for any additional user input (i.e., perhaps other than indicating that he/she desires to view related images via, for example, touch or voice command).

Figure 14:
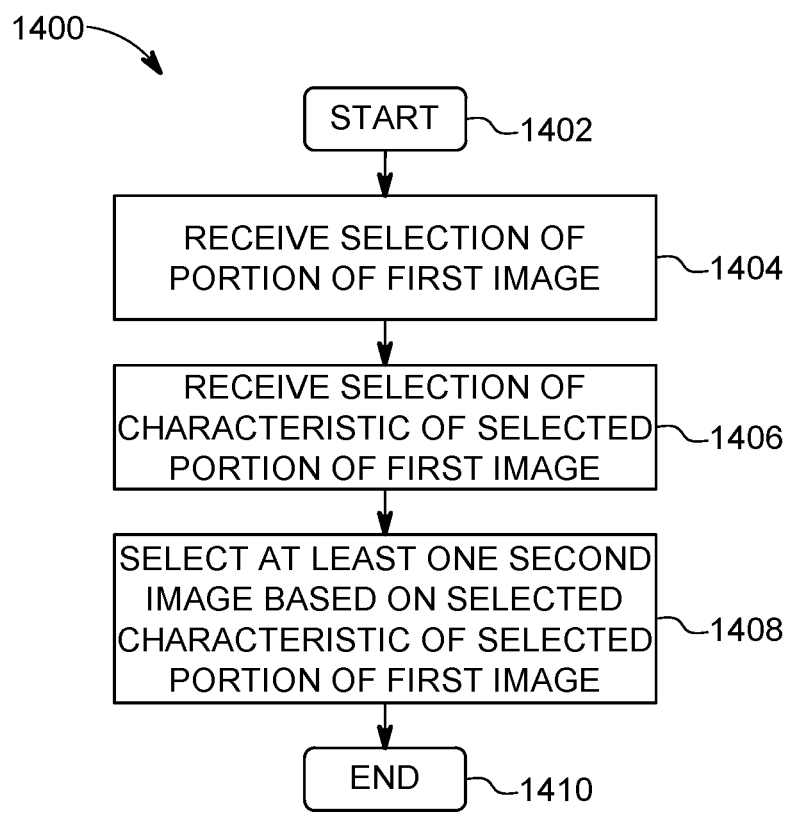
FIG. 14 is a flowchart diagram depicting an exemplary method for managing images in which various aspects of the present invention may be implemented.

Turning to FIG. 14, a flowchart diagram of an exemplary method 1400 for managing images, in which aspects of the present invention may be implemented, is illustrated. Method 1400 begins (step 1402) with, for example, a plurality of images being made accessible to a (first or primary) computing device. For example, the images may be stored in a memory within that particular computing device and/or stored on a remote (or second or secondary) computing device (e.g., via the internet, a wireless network, etc.).

A selection (or an indication or signal representative of a selection) of a portion (or portions) of an initial (or primary) image is received (step 1404). In some embodiments, the initial image is rendered on the (first) computing device, at which point user input indicates the desired (or selected) portion(s) is detected (or received) in a manner similar to that described above (e.g., via a user input device). In some embodiments, the selection of the portion(s) of the image that is of interest is made automatically based on preferences or settings that may be set without the initial image being rendered by the (first) computing device and/or any user input with respect to the initial image being received.

A selection of a characteristic (or characteristics) of the selected portion(s) of the initial image is received (step 1406). In some embodiments, the desired characteristic is selected while the initial image is rendered on the (first) computing device, such as via a user input device or any other manners described above. However, in some embodiments, the characteristic(s) is automatically selected based on previous set preferences or settings without any user input being applied directly to the initial image. In some embodiments, the selection of the characteristic(s) may be performed before the selection of the portion(s) of the image of interest.

One or more second images is then selected from a plurality of images stored, for example, on the (first) computing device and/or on a remote computing device based on the selected characteristic(s) of the selected portion(s) of the initial image (step 1408). In other words, the stored images are searched for images that are related to the initial image with respect to the selected characteristics.

Method 1400 ends (step 1410) with, for example, the image(s) selected during the search being presented to the user (e.g., on the first computing device) or perhaps "tagged" for later use and/or stored in a particular location/file in a memory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing images, comprising:

receiving a selection of at least one portion of a first image;

receiving a selection of a characteristic of the at least one selected portion of the first image; wherein the first image is rendered on a display of a computing device, and at least one of the receiving of the selection of the at least one portion of the first image and the receiving of the selection of the characteristic of the at least one selected portion of the first image includes detecting a user input device within a proximity of the display;

selecting at least one of a plurality of second images based on the selected characteristic of the at least one selected portion of the first image; wherein a number of the at least one of the plurality of second images is selected according to a duration of time the user input device is detected within the proximity of the display such that, as the duration of time the user input device is detected within the proximity of the display increases, a greater number of the plurality of second images are searched to identify the selected characteristic of the at least one selected portion of the first image; and rendering a characteristic menu distinctly separate as an overlay on the first image on the display only after the receiving of the selection of the at least one portion of the first image; wherein the receiving of the selection of the characteristic of the at least one selected portion of the first image includes receiving a selection of an item within the characteristic menu.

2. The method of claim 1, wherein the selected characteristic of the at least one selected portion of the first image includes at least one of a color or an object type.

3. The method of claim 1, wherein the first image is rendered on a first computing device, and at least some of the plurality of second images are stored in a memory of a second computing device, wherein the second computing device is remote from the first computing device.

4. The method of claim 1, further including rendering the selected at least one of the plurality of second images on the display of a computing device.

5. The method of claim 4, wherein the rendering of the selected at least one of the plurality of second images on the display of the computing device includes generating a visual indication of the selected characteristic of the selected at least one portion of the first image on the selected at least one of the plurality of second images.

6. A system for managing mobile devices, comprising:
at least one processor that
receives a selection of at least one portion of a first image;
receives a selection of a characteristic of the at least one selected portion of the first image; wherein the first image is rendered on a display of a computing device, and at least one of the receiving of the selection of the at least one portion of the first image and the receiving of the selection of the characteristic of the at least one selected portion of the first image includes detecting a user input device within a proximity of the display;
selects at least one of a plurality of second images based on the selected characteristic of the at least one selected portion of the first image; wherein a number of the at least one of the plurality of second images is selected according to a duration of time the user input device is detected within the proximity of the display such that, as the duration of time the user input device is detected within the proximity of the display increases, a greater number of the plurality of second images are searched to identify the selected characteristic of the at least one selected portion of the first image; and renders a characteristic menu distinctly separate as an overlay on the first image on the display only after the receiving of the selection of the at least one portion of the first image; wherein the receiving of the selection of the characteristic of the at least one selected portion of the first image includes receiving a selection of an item within the characteristic menu.

7. The system of claim 6, wherein the selected characteristic of the at least one selected portion of the first image includes at least one of a color or an object type.

8. The system of claim 6, wherein the first image is rendered on a first computing device, and at least some of the plurality of second images are stored in a memory of a second computing device, wherein the second computing device is remote from the first computing device.

9. The system of claim 6, wherein the at least one processor further renders the selected at least one of the plurality of second images on the display of a computing device.

10. The system of claim 9, wherein the rendering of the selected at least one of the plurality of second images on the display of the computing device includes generating a visual indication of the selected characteristic of the selected at least one portion of the first image on the selected at least one of the plurality of second images.

11. A computer program product for managing images by one or more processors, the computer program product comprising a non-transitory computer-readable storage medium having computer-readable program code portions stored therein, the computer-readable program code portions comprising:

an executable portion that receives a selection of at least one portion of a first image;

an executable portion that receives a selection of a characteristic of the at least one selected portion of the first image; wherein the first image is rendered on a display of a computing device, and at least one of the receiving of the selection of the at least one portion of the first image and the receiving of the selection of the characteristic of the at least one selected portion of the first image includes detecting a user input device within a proximity of the display;

an executable portion that selects at least one of a plurality of second images based on the selected characteristic of the at least one selected portion of the first image; wherein a number of the at least one of the plurality of second images is selected according to a duration of time the user input device is detected within the proximity of the display such that, as the duration of time the user input device is detected within the proximity of the display increases, a greater number of the plurality of second images are searched to identify the selected characteristic of the at least one selected portion of the first image; and an executable portion that renders a characteristic menu distinctly separate as an overlay on the first image on the display only after the receiving of the selection of the at least one portion of the first image; wherein the receiving of the selection of the characteristic of the at least one selected portion of the first image includes receiving a selection of an item within the characteristic menu.

12. The computer program product of claim 11, wherein the selected characteristic of the at least one selected portion of the first image includes at least one of a color or an object type.

13. The computer program product of claim 11, wherein the first image is rendered on a first computing device, and at least some of the plurality of second images are stored in a memory of a second computing device, wherein the second computing device is remote from the first computing device.

14. The computer program product of claim 11, wherein the computer-readable program code portions further include an executable portion that renders the selected at least one of the plurality of second images on the display of a computing device.

15. The computer program product of claim 14, wherein the rendering of the selected at least one of the plurality of second images on the display of the computing device includes generating a visual indication of the selected characteristic of the selected at least one portion of the first image on the selected at least one of the plurality of second images.

* * * * *